United States Patent
Lambert et al.

(10) Patent No.: US 11,565,316 B2
(45) Date of Patent: Jan. 31, 2023

(54) SINTERED METAL MATERIAL HAVING DIRECTIONAL POROSITY AND COMPRISING AT LEAST ONE FERROMAGNETIC PART, AND PRODUCTION METHOD THEREOF

(71) Applicant: OFFICE NATIONAL D'ETUDES ET DE RECHERCHES AEROSPATIALES (ONERA), Palaiseau (FR)

(72) Inventors: Oceané Lambert, Montrouge (FR); Cécile Davoine, Antony (FR)

(73) Assignee: OFFICE NATIONAL D'ETUDES ET DE RECHERCHES AEROSPATIALES (ONERA), Palaiseau (FR)

( * ) Notice: Subject to any disclaimer, the term of this patent is extended or adjusted under 35 U.S.C. 154(b) by 558 days.

(21) Appl. No.: 16/494,058

(22) PCT Filed: Mar. 14, 2018

(86) PCT No.: PCT/FR2018/050615
§ 371 (c)(1),
(2) Date: Sep. 13, 2019

(87) PCT Pub. No.: WO2018/167430
PCT Pub. Date: Sep. 20, 2018

(65) Prior Publication Data
US 2021/0121956 A1     Apr. 29, 2021

(30) Foreign Application Priority Data

Mar. 16, 2017 (FR) ...................................... 1752137

(51) Int. Cl.
B22F 3/11 (2006.01)
B22F 3/22 (2006.01)
B22F 7/00 (2006.01)

(52) U.S. Cl.
CPC .......... B22F 3/1103 (2013.01); B22F 3/1121 (2013.01); B22F 3/222 (2013.01);
(Continued)

(58) Field of Classification Search
None
See application file for complete search history.

(56) References Cited

U.S. PATENT DOCUMENTS

2012/0306308 A1\* 12/2012 Nishiuchi ............. H01F 41/028
427/127
2017/0021416 A1\* 1/2017 Park ......................... B22F 3/24

FOREIGN PATENT DOCUMENTS

CN        104593630 A    5/2015
JP        H04 36409 A    2/1992
(Continued)

OTHER PUBLICATIONS

Plunk et al: "Iron foams created by directional freeze casting of iron oxide. reduction and sintering" Materials Letters, Elsevier, Amsterdam, NL., vol. 191, Dec. 29, 2016, pp. 112-115. XP029902065.
(Continued)

Primary Examiner — Xiaobei Wang
(74) Attorney, Agent, or Firm — Volpe Koenig

(57) ABSTRACT

The invention relates to a sintered metal material comprising at least one magnetic part, characterised by directional through-pores having a size of between 1 and 100 μm, said material having a density varying by less than 20% from one sample of 1 cm3 to another taken from a one-piece part made from the material.

15 Claims, 2 Drawing Sheets

(52) U.S. Cl.
CPC .......... *B22F 7/004* (2013.01); *B22F 2998/10* (2013.01); *C22C 2202/02* (2013.01); *Y10T 428/1216* (2015.01); *Y10T 428/12042* (2015.01); *Y10T 428/12174* (2015.01)

(56) References Cited

FOREIGN PATENT DOCUMENTS

| | | |
|---|---|---|
| JP | H05 271716 A | 10/1993 |
| JP | 2006 052451 A | 2/2006 |

OTHER PUBLICATIONS

Rothlisberger et al: "Synthesis, structure and mechanical properties of ice-templated tungsten foams" Journal of Materials Research, vol. 31. No. 06, Mar. 1, 2016, pp. 753-764. XP055478379.

Tang et al: Fabrication of lamellar porous alumina with axisymmetric structure by directional solidification with applied electric and magnetic fields Journal of the European Ceramic Society, vol. 36. No. 5, Dec. 22, 2015, pp. 1233-1240. XP029387680.

Porter et al: "Microstructural Control of Colloidal-Based Ceramics by Directional Solidification Under Weak Magnetic Fields" Journal of the American Ceramic Society, vol. 99. No. 6, Jun. 1, 2016, pp. 1917-1926. XP055478164.

\* cited by examiner

SINTERED METAL MATERIAL HAVING DIRECTIONAL POROSITY AND COMPRISING AT LEAST ONE FERROMAGNETIC PART, AND PRODUCTION METHOD THEREOF

FIELD OF THE INVENTION

The invention relates to sintered materials with porosity oriented by magnetic field and the manufacture thereof. The porosities are oriented, fine—of the order of ten microns—and open-ended.

BACKGROUND

There are several processes for producing materials with oriented porosity:

A first technique consists in creating a composite material, one of the phases of which will be removed by decomposition or by evaporation, described by the article by D. C. Dunand in Advanced Engineering Materials 6 (6) (2004).

Jorgensen et al propose, in Acta Materalia 59 (2011) 640-50, densifying steel wires with titanium sheets or powder, then removing the steel electrochemically. The size of the pores is then determined by the diameter of the wires. This process does not enable very fine porosities. In addition, the materials obtained have porous and irregular walls and the architecture is difficult to control.

A second technique consists in sintering the powder under gas pressure to create bubbles in the material which will then be oriented by a thermomechanical treatment of the part. Kearns et al have thus studied, in International journal of powder metallurgy 24 (1) (1988) 59-64, the manufacture of porous titanium parts by hot isostatic pressing of metallic powder in the presence of argon, complete densification being prevented by the presence of the gas. A heat treatment of the part at high temperature for several days then enables the expansion of the gas bubbles by creep of the material around them. In order to orient the pores, the part can be rolled or extruded. Davis et al (Journal of Materials Research 16 (5) (2001) 1508-19) merged these last two steps by carrying out thermal cycling under unidirectional mechanical stress on the superplastic alloys. These processes make it possible to obtain large porosities, up to 40% under certain conditions, but require very expensive equipment as well as numerous steps, including the heat treatment which can be very long. In addition, a high density of open-ended porosities is obtained only for superplastic alloys, and in this most favorable case, the aspect ratio of the pores is 2 on average. The preferential orientation of the pores is therefore not very pronounced.

In order to simplify this process and to ensure a strong pore orientation, D. Spoerke et al (Journal of Biomedical Materials Research Part A 84 (2) (2008) 102-418) propose replacing the powder with titanium wires. Even if pore aspect ratios of up to 25 are obtained, the total porosity does not exceed 13%, with open porosities not exceeding 10% thereof.

Finally, the materials referred to as gasar or lotus according to CN104593630 or Nakajima H, Material Science 52 (2007) 1091-1173 have cylindrical porosities created by the difference in the solubility of a gas in a metal in the liquid and solid phase. The molten metal is saturated with gas and then solidified directionally. The gas is then discharged at the solidification front, creating porosities in the direction perpendicular to the front. This method is however very tricky to implement, since numerous parameters need to be optimized, especially the nature and the pressure of the gas, the solidification rate, etc., leading to porosities of considerable size, of the order of a few hundred microns to a few millimeters.

M. Porter et al. propose, in J. Am. Ceram. Soc. 99 (2016) 1917-1926, manufacturing zirconia/magnetite composite porous materials by a conventional freeze-casting technique under the action of a magnetic field. Here too, the internal structure of the porous material is governed by the directional solidification of the solvent. Indeed, the magnetic particles in suspension are sufficiently fine for gravity to be negligible and for the dispersion of the particles to be due to interparticle forces (Van derWaals, electrostatic, steric). The magnetic particles agglomerate in areas of higher magnetic flux density and create inhomogeneities in the final material, but do not become uniformly distributed in the solution and ultimately do not participate in the overall architecture of the part. In addition, in this process, the structure of the porous material obtained is intrinsically linked to the directional solidification of the solvent, which leads to several difficulties:

If the powders are too fine they may not be discharged into the inter-dendritic space, but be included in the dendrites and thus hinder the pores of the final part;

The first ice crystals in contact with the cooling plate are equiaxial, which creates a more dense layer at the end of the process, which limits the overall permeability of the part. This layer is difficult to remove a posteriori since cutting up a porous material by conventional techniques clogs the pores and may create a dense layer at the surface;

As the ice dendrites form, the thermal gradient experienced by the liquid solvent decreases since the ice is insulating, and this therefore produces crystals which will become increasingly large. There is therefore an inhomogeneity of the porosity in the thickness of the part;

This process is highly dependent on the solvent used. This is because each solvent crystallizes in a certain way. For each solvent, it is therefore necessary to perform a new parametric study to obtain the desired properties.

In the field of ceramics, the technique referred to as "freeze-casting", described by S. Deville in Acta Materalia 55 (2007) 1965-74, makes it possible to obtain ceramic materials with oriented porosities in a few steps:

1. A mixture of nanoscale powders and solvent is prepared.
2. The mixture is placed on a cooling plate in order to directionally solidify the solvent, forming dendrites in the direction of the solidification front.
3. The solvent is then sublimated under vacuum, passing under its triple point: the green body obtained has oriented porosities that reproduce the shape of the former dendrites.
4. The material is finally sintered at high temperature to obtain the final p art.

The material thus obtained has oriented microporosities from a certain thickness. The first water crystals are equiaxial, then the dendrites begin to form and become uniform in size and direction from 60 µm of thickness.

The Applicant has discovered that the application of this process as described in the above article with metallic powders in an aqueous solution to obtain oriented porosities of the order of ten microns is virtually impossible. This is because metallic powders are denser and larger than the ceramic powders (because the latter can be ground very finely), the Applicant having observed sedimentation before solidification of the water. The dendrites therefore fail to force the powder into the inter-dendritic space and the final porosities are not oriented. If the viscosity of the solvent is increased, the material obtained can be very porous but not oriented because the dendrites fail to develop within the three-dimensional network created by the binder. A porous material with non-oriented porosity is obtained.

This is why, in the literature, very few cases of metallic freeze-casting are recorded. The process as such was only able to be applied to fine, and therefore light, titanium powders, whether in aqueous solution as by JC Li et al., Acta Materalia 59 (2011) 146-58; Chino Y. et al, Acta Materalia 56 (2008) 105-13; or with camphene as a solvent as by SW Yook et al, Materials Letters 63 (2009) 1502-4.

M. Fukushima et al, in Materials Letters 153 (2015) 99-101, have been able to circumvent the problem of sedimentation by adding a gelling agent to the aqueous solution. A first step consists in cooling the mixture below the gelation temperature in order to obtain a homogeneous dispersion of the powder in a highly viscous medium in which there is no sedimentation, then in solidifying the water directionally. This process is however very difficult to implement because the three-dimensional network created by the gel hinders the growth of the dendrites and can easily give rise to a non-oriented structure. In addition, it is necessary to use an extremely fine powder of approximately 400 nm, which is therefore expensive, so that it can be effectively forced into the inter-dendritic space. These powders less than 1 μm in size also have increased toxicological risks.

Recently, techniques to obtain copper parts (A. I. Cuba Ramos et al, Materials Letters 153 (2015) 99-101 or nickel parts (H. Jo et al., Metallurgical and Materials Transactions E 3E (2016) 46-54 by freeze-casting from oxide powders have been developed. The disadvantage of this technique is the strong shrinkage during sintering due to the reduction of the oxide which causes the appearance of cracks, as well as the heterogeneity in size, shape and orientation of the pores due to the difficulty of success of the unidirectional freezing step.

The above processes, according to the observations made by the Applicant, make it difficult to obtain a material with porosities of the order of ten micrometers, which are open and strongly oriented.

To the Applicant's knowledge, therefore, there is currently no process enabling easy production of homogeneous parts with oriented porosity of the order of ten microns from metallic powders of micrometric dimensions which are denser than titanium.

The invention improves the situation.

SUMMARY

In one embodiment, the sintered metallic material having a lamellar structure comprises at least one magnetic portion. The material is provided with open-ended oriented porosities of dimension of between 1 and 100 microns. The material has a density varying by less than 20% from one 1 cm3 sample to another, taken from a single-piece part made from said material. Said material has excellent properties resulting from the large specific surface area thereof. The magnetic portion is ferromagnetic or ferrimagnetic.

Metallic is intended to mean a material composed of metal atoms and possibly non-metal atoms, the atoms being bonded together by metal bonds. In general, a metallic material comprises at least 50 atomic % of metal.

In one embodiment, the material comprises a non-magnetic portion in a volume proportion of less than or equal to 50%. The two powders—magnetic and non-magnetic—may be co-kneaded beforehand so that the magnetic powders can carry the non-magnetic powders along in the presence of the magnetic field. The magnetic part is thus sufficient to obtain alignment of the powder to be sintered along magnetic field lines.

In one embodiment, the non-magnetic portion comprises at least one from: aluminum, niobium, titanium, chromium, molybdenum, manganese, magnesium. Titanium and niobium are biocompatible so the materials obtained can be used to manufacture medical prostheses. The powders can be mixed independently of their densities by co-grinding.

In one embodiment, the magnetic portion is ferromagnetic.

In one embodiment, the magnetic portion comprises at least one from: iron, nickel, cobalt, ferromagnetic alloy, especially ferromagnetic steel.

In one embodiment, the magnetic portion comprises nickel.

In one embodiment, the material comprises a ferrimagnetic portion in a volume proportion of less than or equal to 50%.

In one embodiment, the magnetic portion comprises at least one from: samarium-cobalt, neodymium-iron-boron.

In one embodiment, the pores have an aspect ratio greater than 5.

In one embodiment, the process for manufacturing a sintered metal material comprises:

a. mixing a powder, at least a portion of which is magnetic, with a solvent and pouring the mixture into a mold, b. applying a magnetic field to the mixture, the magnetic field being parallel to within +/−10° to the gravitational field lines in order to cause the magnetic field lines to pass into the molded mixture, causing the displacement of the powder until it is flush with an upper surface of the mixture, c. fixing the structure by solidifying the solution, d. sublimating the solidified solution, e. carrying out a heat treatment of the part.

Thus, the powder is oriented by the magnetic field and will become aligned along the field lines. The assembly is cooled while maintaining the magnetic field until the structure is fixed by the solidification of the solvent. Thus, there is the benefit of simple steps that do not require expensive equipment and make it possible to develop parts, the internal structure of which is composed of lamellae having porosities oriented in the direction of the magnetic field, of a size of the order of ten microns. Indeed, under the action of the magnet, the grains of powder behave like magnetic dipoles and align themselves with the field lines. The grains of powder form zones in which the lamellae have the same orientation corresponding to the local magnetic field. These lamellae all have a preferential orientation along the north-south axis of the magnet and their disorientation provides mechanical strength to the assembly.

The magnetic field may be obtained by a magnet or a coil. The magnetic field is then readily adjustable by the electrical intensity flowing through the coil and the material obtained is even more homogeneous than with a magnet since the field lines have better parallelism.

This thus eliminates a unidirectional solidification step since the orientation of the pores is due to the presence of the magnetic field. The solvent is a means of fixing the structure. Defects related to directional solidification are avoided. For example, in conventional parts, the first equiaxial solidification zone forms a layer that blocks porosities oriented on a surface and alters permeability properties. It is very difficult to take up a porous material without blocking the pores thereof. Defects associated with a growth of secondary arms parallel to the solidification front, liable to create cracks in the lamellae, are also eliminated.

Finally, inhomogeneity of the size of the pores along the thickness of the part is avoided, due to the low thermal conductivity of the ice which creates a solidification rate gradient. By freeing the orientation of the pores from the direction of directional solidification, a material with porosities oriented homogeneously in the part is obtained.

In one embodiment, the magnetic portion has a particle size of greater than 1 µm.

In one embodiment, the powder has a particle size of greater than 1 µm.

In one embodiment, the mixture of powder and solvent further comprises a binder, the binder being eliminated during sintering or during a debinding step. Debinding is understood to mean a step of removing the binder. Debinding may include a low temperature hold of about 300-400° C., removing the binder. Such a temperature, significantly lower than the sintering temperature, makes it possible to avoid chemical pollution by carbonaceous residues during high-temperature sintering of the part. The proportion of binder relative to the solvent is preferably between 1 and 5% by weight.

Preferably, the proportion of binder relative to the solvent is between 1.5 and 4% by weight. The solvent is a means of fixing the structure in the magnetic field by virtue of the binder before sintering the part.

In one embodiment, the solvent is selected from: water, camphene, TBA (tert-butyl alcohol).

In one embodiment, the solvent has a dynamic viscosity of between 1 and 2×10³ Pa·s measured by a viscometer such as a Brookfield viscometer according to ISO 2555 and ASTM D2196.

In one embodiment, the magnetic field is determined such that, the powder consisting of grains, the grains become magnetized and oriented in the direction of the field while remaining in the mixture. The magnetic field is generated by a permanent magnet or a coil.

In one embodiment, the magnetic field is less than 30 mT, preferably less than 20 mT, more preferentially between 0.5 and 3 mT for nickel powder.

In one embodiment, the solvent is sublimated by lyophilization or vacuum pumping at low temperature, below the triple point of the solvent.

In one embodiment, the powder has a mean particle diameter of between 0.5 and 50 microns.

In one embodiment, the powder has a particle diameter less than a value located in the range of 2 to 100 microns.

In one embodiment, the sintering is carried out under inert gas under a pressure of 0 to 0.25 bar for a duration of between 30 and 180 minutes, at a temperature less than ⅔ of the melting point of the metal expressed in Kelvin.

In one embodiment, the sintering duration is between 40 and 90 minutes.

In one embodiment, the sintering temperature is less than ⅔ of the melting point of the metal having the lowest melting point.

In one embodiment, the sintering temperature is less than ⅔ of the melting point of the metal expressed in Kelvin, decreased by 100 K.

In one embodiment, the sintering temperature is less than ⅔ of the melting point of the metal having the lowest melting point, expressed in Kelvin, decreased by 100 K.

In one embodiment, the sintering is carried out with a temperature ramp of less than or equal to 20 K per minute, preferably less than or equal to 10 K per minute.

In one embodiment, the sintering is followed by the deposition of another material on the surface. The other material may be deposited by carburization, CVD, PVD, electrochemical or electrolytic deposition, powder impregnation.

In one embodiment, the mixture is cast in an organized structure, obtained for example by additive manufacturing, said organized material providing mechanical strength to the porous material after sintering. Said organized material may consist of a carrier structure made of dense metal, as opposed to the sintered metal. Said organized material may consist of a rigid 3D grid. Said organized material may consist of a set of posts and beams, for example originating from foundry. The mixture surrounds the organized material and benefits from its mechanical strength while offering its intrinsic properties.

In one embodiment, the density of the ferromagnetic portion is greater than the density of the titanium.

BRIEF DESCRIPTION OF THE DRAWINGS

The present invention will be better understood from the detailed description of some embodiments taken as non-limiting examples and illustrated by the appended drawings.

DETAILED DESCRIPTION OF THE PREFERRED EMBODIMENTS

Figure 1:
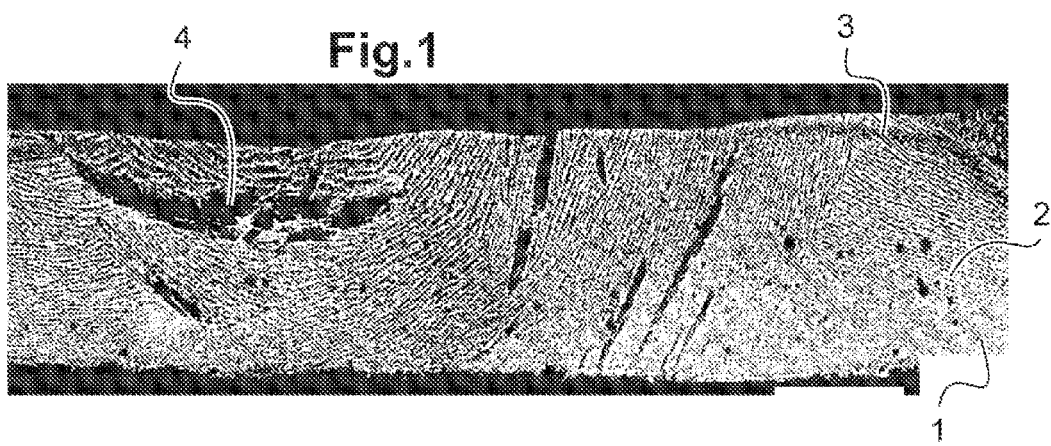
FIGS. 1 to 4 are sectional extracts of samples of materials taken under an optical microscope.

Metallic materials with oriented porosity are of interest in numerous applications such as filtration or the diffusion of chemical species. The micropores can also be effectively infiltrated by a liquid, for example lubricant in parts for which it is desired to delay the mechanical wear. The large specific surface area of the materials with oriented porosity also makes them very good choices for porous electrodes or for catalysis applications. These materials are very good absorbers of thermal, mechanical or electromagnetic energy, which makes them of great interest for applications in heat exchangers, protection against impacts or shock waves, shields for electrical installations against interference due to parasitic radiation, etc.

Moreover, carefully dimensioned materials with controlled porosity can accurately reproduce the anisotropic morphology of bones and therefore their mechanical properties. It would become possible to improve the quality and service life of biomedical prostheses and also osseointegration thereof.

The phenomena involved in the invention can be explained in a simplified two-dimensional case in which the applied magnetic field is unidirectional, in the vertical direction and in which the powder is spherical.

The powder is immersed in the solvent: each particle is subjected to gravity, which tends to cause it to sediment, and also Archimedean upthrust, which tends to cause it to float. The density and the size of the metallic and possibly non-metallic grains of powder are such that gravity overcomes Archimedean upthrust and the powder flows to the bottom of the mold.

A magnetic field $\vec{B}$ is applied to the mixture. If this field is large enough, gradually each grain of magnetic powder becomes magnetized in the direction of the magnetic field $\vec{B}$. Each grain of magnetic powder behaves locally like a small magnet. Through the action of forces of magnetic repulsion and attraction, the grains of powder will create chains in the direction of the magnetic field $\vec{B}$. This movement will be greatly facilitated by the Archimedean upthrust exerted by the solvent.

These strings of grains of powder will rise up to the solvent/air interface. The force generated by the magnetic field $\vec{B}$ tends to extend the alignment of the structures beyond this interface by causing grains of powder to leave the solvent. However, this crossing of the interface would expend energy:

the absence of Archimedean upthrust makes the movement of the grains of powder much more difficult in the air, the air/water surface tension tends to prevent the crossing of the grains of powder.

There is therefore an opposition between:

the forces aiming to cause the interface to be crossed: the attractive force of the magnet and the repulsive forces between neighboring strings of powder, the forces aimed at confining the powder under the solvent/air interface mentioned above.

A magnetic field $\vec{B}$ is applied in a precise range to create the final material: strong enough to magnetize the powder and create the alignment of the particles, but without exceeding the value for which the powder crosses the interface.

In order to obtain the final material, the solvent is then solidified and then sublimed, and the part is sintered at high temperature.

In a real three-dimensional system, lamellae of powder are obtained, and not columns. This is explained by the repulsive and attractive forces that would tend to form two-dimensional structures. If the magnetic field lines are not parallel in the space considered, as is the case if using a conventional magnet, zones in which the lamellae have the same orientation, corresponding to the local magnetic field, are observed. These lamellae all have a preferential orientation along the main axis of the magnet. The disorientation thereof provides mechanical strength to the assembly. Indeed, if all the lamellae of the sample were perfectly parallel, the assembly would be extremely fragile when stressed perpendicularly to the lamellae. Partial disorientation of the lamellae improves resistance to transverse stresses.

The solvent/air interface confines the powder. The volume of the final part is thus easily controllable since it is equal to the volume of solvent. This also makes it possible to precisely vary the porosity of the part. All parameters being otherwise equal, if there is more solvent, the space between the chains of powder will be larger and the final part will therefore be more porous.

The microstructure is composed of lamellae with open porosities oriented in the direction of the magnetic field, of a size of the order of ten microns. The choice of parameters enables pore sizes between 1 and 100 µm and a homogeneity of the material obtained such that the density varies by less than 20% from one 1 cm3 sample to another, taken from a single-piece part made from said material, especially a part of a volume of 4 cm3.

A non-magnetic portion is possible in volume proportion of less than or equal to 50%. The non-magnetic portion comprises at least one from: aluminum, niobium, titanium, chromium, molybdenum, manganese, magnesium.

A ferromagnetic portion is also possible in volume proportion of less than or equal to 50%.

In the general case, the magnetic portion is ferromagnetic and comprises at least one from: iron, nickel, cobalt, ferromagnetic alloy, especially ferromagnetic steel.

Figure 5:
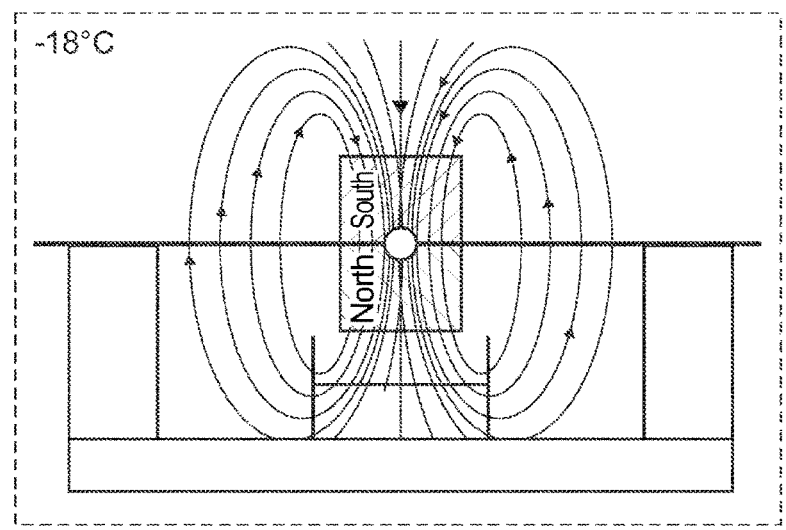
FIG. 5 shows an example of assembly for the process.

In a first test, a cylindrical nickel slug with oriented porosities was manufactured. An aqueous solution containing 3% by weight of organic binder, in this case polyvinyl alcohol (PVA), is prepared. Then 7.5 g of pure nickel powder, with a diameter of less than 3 µm, are mixed with 4 ml of aqueous solution. The mixture is poured into a Teflon pad 3 cm in diameter resting on a metal plate, then a ferrite magnet is placed a few centimeters above the pad using a non-magnetic strip fixed on lateral supports, see FIG. 5. The average field at the aqueous solution loaded with nickel powder is of the order of 2 mT. The magnet is of elongate form and arranged so as to have field lines perpendicular to the surface of the solvent. The field lines are vertical for a portion of the solution and rounded for other portions of the solution. The mounting assembly is then placed in a cooling chamber set at a temperature below the solidification temperature of the aqueous solution, for example −18° C., until complete solidification of the water.

The solidified solution and the metal plate supporting it are then removed and mounted on a cooling plate set at −10° C. The plate is then covered with a suitable sealed cover and connected to a vacuum pump. The vacuum pump makes it possible to reach a vacuum of the order of a few tenths of a Pascal. The pressure is controlled by a pressure sensor. After 16 h, the water is entirely sublimated. In addition, a liquid nitrogen trap makes it possible to recondense the water vapor to protect the pump.

Once the sublimation of the water is achieved, this gives a green body with oriented grains of powder, the strength of which is temporarily provided by the binder.

The green body is subjected to a heat treatment of 60 minutes at 900° C. under a stream of argon to obtain the final sintered part which has a diameter of 2.5 cm, i.e. a shrinkage of 17%. The pressure is 0.25 bar. The rise in temperature is 10 K/minute. The fall in temperature is 10 K/minute.

It has been found that the free surface obtained is relatively rough. To obtain flat and parallel surfaces, the two end faces can be polished. This creates a dense surface layer. The surface layer can be removed by immersing the part in a solution of nitric acid diluted to 50%. This step can also be avoided by using a mold for which the free surface does not correspond to a surface of interest. The sintered part has entangled nickel lamellae with an average pore size of 50 µm. The pores are open-ended. The Darcy permeability of the sample is 10-12 m2. The heat treatment has an influence on the density of the lamellae and on the shrinkage. The alignment of the pores on the magnetic field lines is preserved. The density is homogeneous.

Furthermore, the Applicant manufactured other samples according to the table below with pure nickel powder with a mean diameter of 3 µm:

| No. | Weight of powder (g) | Volume of the solution (ml) | % by weight of PVA | Duration of freezing (days) | Duration of sintering (h) | Rise and fall ramp of the oven (° C./min) | Sintering temperature (° C.) | Porosity of the part (%) |
|---|---|---|---|---|---|---|---|---|
| 1 | 7.5 | 4 | 2 | 2 | 1 | 10 | 900 | 72 |
| 2 | 7.5 | 3 | 2 | 2 | 1 | 10 | 900 | 64 |

-continued

| No. | Weight of powder (g) | Volume of the solution (ml) | % by weight of PVA | Duration of freezing (days) | Duration of sintering (h) | Rise and fall ramp of the oven (° C./min) | Sintering temperature (° C.) | Porosity of the part (%) |
|---|---|---|---|---|---|---|---|---|
| 3 | 7.5 | 5 | 2 | 2 | 1 | 10 | 900 | 74 |
| 4 | 7.5 | 5.5 | 3 | 2 | 1 | 10 | 900 | 75 |

FIG. 1 shows one aspect of the sample no. 1 with a lower zone 1 having a slightly less porous zone over a small height of a few % of the height of the sample.

The zone of interest 3 has an orientation of the nickel lamellae that is indeed parallel to the north/south axis of the magnet. The lamellae are therefore relatively close to the vertical near the peripheral zone 2 and increasingly inclined closer to the central zone 4 located under the magnet. The central zone 4 has a portion with heterogeneities. The average inter-lamellar space is 18.2 μm+/−2. The porosity content is 72%.

From observing FIG. 1, the Applicant deduces the benefit in implementing a magnetic field with parallel field lines over the entire zone of the sample, for example by means of a magnet assembly or an electromagnetic coil. The sedimentation present in the lower zone 1 can also be reduced if necessary by the use of a sonotrode or an ultrasonic bath.

Figure 2:
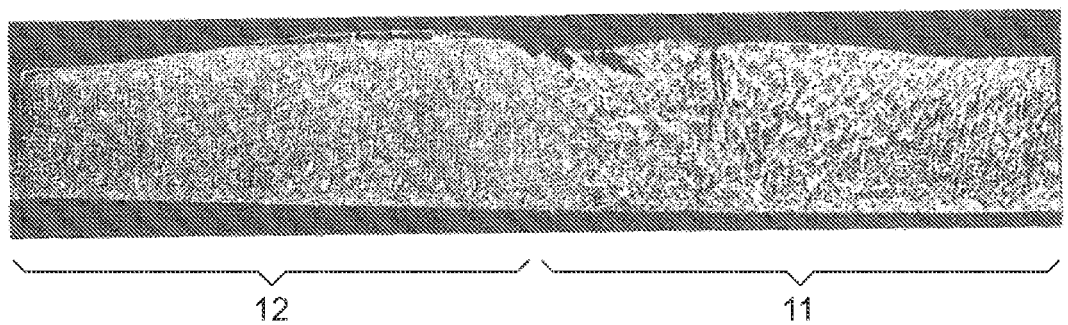
Figure 3:
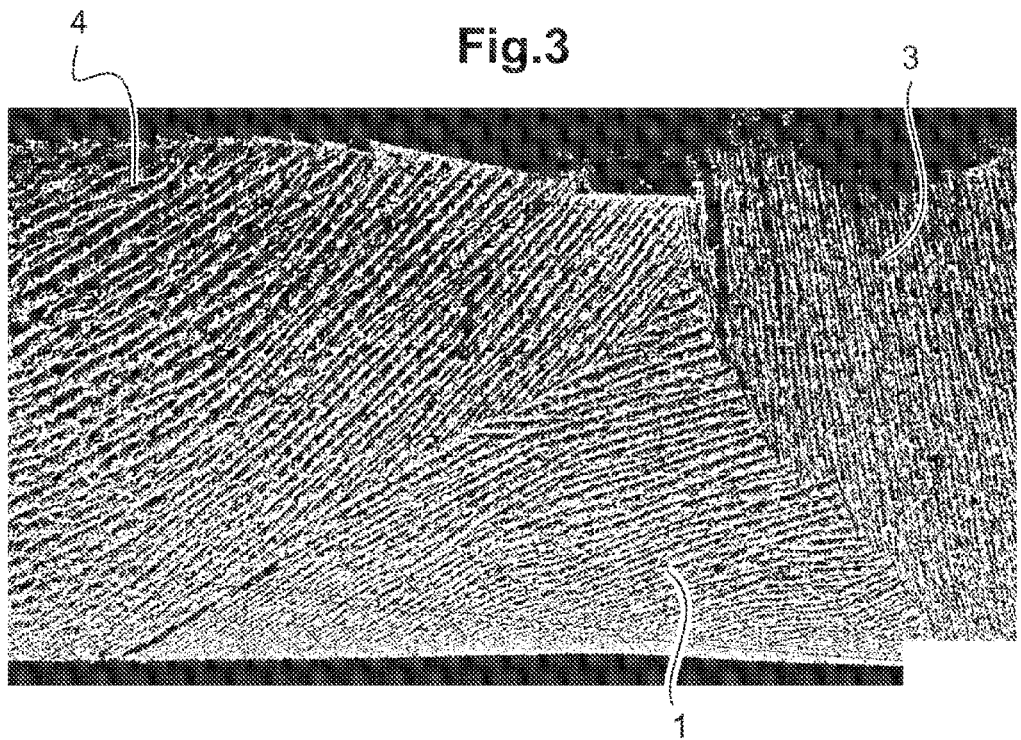

Sample no. 2 illustrated in FIG. 2 presents a zone 11 with porosities oriented in a plane perpendicular to the plane of observation. This zone lacked solvent, limiting the ability to orient along the field lines. The sample has a zone of interest 12 with porosities oriented in a relatively parallel manner. The sedimentation effect in the lower zone is weaker than on the sample 1. The lamellae are tight and the density obtained is high, which corresponds to a lower porosity than for sample no. 1. The effect of decreasing the amount of solution between sample no. 1 and sample no. 2 is that of having smaller inter-lamellar spaces. The average inter-lamellar space is 10 μm+/−6. The porosity content is high, at 64%.

Sample no. 3 has an appearance closer to sample no. 1 with a lower zone 1 having a slight sedimentation of the powder prior to sublimation, a central zone 4 having porosities that are parallel by zones. The average inter-lamellar space is 31 μm+/−4. The porosity content is high, at 74%. The sample has rough patches.

The porosity is higher than for samples no. 1 and no. 2. The presence of zones 3 and 4 is observed, in which the lamellae are parallel to one another.

Figure 4:
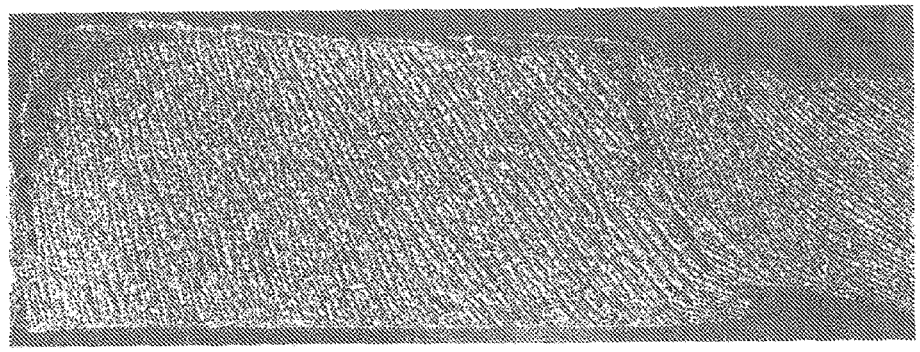

In the embodiment of FIG. 4, sedimentation at the bottom of the sample is low. The inter-lamellar space is larger than for sample no. 3. The porosities are oriented virtually vertically. Surface rough patches are present. The average inter-lamellar space is 41 μm+/−7. The porosity content is very high, at 75%.

The comparison between samples no. 1 to no. 4 makes it possible to study the influence of the parameter of the volume of the solution. An increase in the volume of the solution results in an increase in the porosity content and an increase in the inter-lamellar space.

Finally, it is preferable to apply the magnetic field before placing in the cooling chamber in order to enable the powders to become placed along the magnetic field lines before solidification of the solution.

Figure 6:
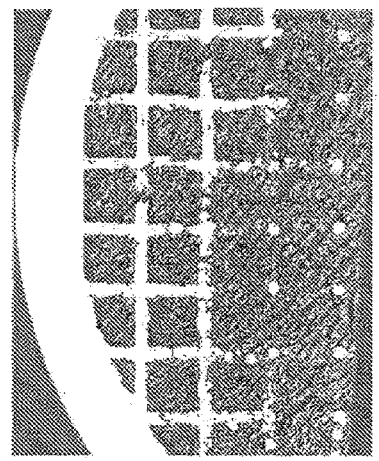
FIG. 6 is an optical micrograph of organized material surrounded by sintered metallic material.

FIG. 6 illustrates an example of sintered metallic material formed around a metallic structure of nominal density. Nominal density is intended to mean here the density of a microscopically solid metal or metal alloy, for example one which is cast or machined. The metallic structure here is a square mesh grid surrounded by a ring. The metallic structure has mechanical properties superior to the mechanical properties of the sintered metal material. The metallic structure is obtained by casting or by additive manufacturing. The sintered metallic material fills the square holes of the grid. In practice, provision is made either to keep the upper surface of the grid free, or to cover it with the sintered metallic material. The sintered metallic material is obtained using 7.5 g of Ni powder, 5 ml of solution, 2% of PVA with a sintering of 1 hour at 900° C., the other parameters being identical to those of the test no. 3. The interlamellar space obtained is 37 μm+/−2. The sintered metallic material is compatible with a mechanically strong structure.

The invention claimed is:

1. A sintered metallic material having a lamellar structure and comprising at least one magnetic portion, said sintered metallic material comprising open-ended oriented porosities of dimension of between 1 and 100 μm, said sintered metallic material having a density varying by less than 20% from one 1 cm$^3$ sample to another, taken from a single-piece part made from said sintered metallic material, wherein the sintered metallic material is denser than titanium.

2. The material as claimed in claim 1, comprising at least one non-magnetic portion in a volume proportion of less than or equal to 50% and optionally a ferrimagnetic part in a volume proportion of less than or equal to 50%.

3. The material as claimed in claim 2, wherein the non-magnetic portion comprises at least one of: aluminum, niobium, titanium, chromium, molybdenum, manganese, or magnesium.

4. The material as claimed in claim 1, wherein the magnetic portion is ferromagnetic and comprises at least one of: iron, nickel, cobalt, ferromagnetic alloy, or ferromagnetic steel.

5. A process for manufacturing a sintered metallic material, comprising:
   providing a mixture of metallic powder and of solvent, the powder comprising a magnetic portion,
   casting the mixture into a mold,
   applying a magnetic field parallel to within +/−10° to the gravitational field lines in order to cause the magnetic field lines to pass into the molded mixture, causing the displacement of the powder until the powder is flush with an upper surface of the mixture,
   cooling the molded mixture to a temperature below the solidification temperature of the solvent,
   sublimating the solidified solvent,
   sintering the powder to obtain the sintered metallic material, the pores of the sintered metallic material being aligned along the magnetic field lines, being open-ended and being of dimension of between 1 and 100 μm, the sintered metallic material having a density varying by less than 20% from one 1 cm$^3$ sample to another, taken from a single-piece part made from said sintered metallic material.

6. The process as claimed in claim 5, wherein the mixture of powder and solvent further comprises a binder, the binder being eliminated during sintering, the proportion of binder relative to the solvent being preferably between 1 and 5% by weight.

7. The process as claimed in claim 5, wherein the solvent is chosen from the group consisting of: water, camphene, or tert-butyl alcohol and 2-methylpropan-2-ol.

8. The process as claimed in claim 5, wherein the magnetic field is determined such that, the powder consisting of grains, the grains become magnetized and oriented in the direction of the field while remaining in the mixture, the magnetic field being generated by a permanent magnet or a coil.

9. The process as claimed in claim 5, wherein the magnetic field is less than 30 mT.

10. The process as claimed in claim 5, wherein the solidified event is sublimated by lyophilization or vacuum pumping at a temperature below the triple point of the solvent.

11. The process as claimed in claim 5, wherein the powder has a mean particle diameter of between 0.5 and 50 μm and/or the powder has a particle diameter less than a value located in the range of 2 and 100 μm.

12. The process as claimed in claim 5, wherein the sintering is carried out under inert gas under a pressure of 0 to 0.25 bar for a duration of between 30 and 180 minutes, at a temperature less than ⅔ of the melting point of a metal of the metallic powder mixture having the lowest melting point expressed in Kelvin.

13. The process as claimed in, claim 5, wherein the sintering is carried out with a temperature rise and fall ramp of less than or equal to 10 K/minute.

14. The process as claimed in claim 5, wherein the sintering is followed by a deposition of another material on a surface of the sintered metallic material, by carburization, CVD, PVD, electrochemical or electrolytic deposition, or powder impregnation.

15. The process as claimed in claim 5, wherein the mixture is cast in an organized structure, obtained by additive manufacturing or by foundry, to provide mechanical strength.

* * * * *

UNITED STATES PATENT AND TRADEMARK OFFICE
CERTIFICATE OF CORRECTION

PATENT NO. : 11,565,316 B2
APPLICATION NO. : 16/494058
DATED : January 31, 2023
INVENTOR(S) : Oceané Lambert and Cécile Davoine It is certified that error appears in the above-identified patent and that said Letters Patent is hereby corrected as shown below:

In the Claims

In Claim 10, at Column 11, Line 21, after the word "solidified", delete the word "event" and insert the word --solvent-- therefor.

Signed and Sealed this
Twenty-fifth Day of July, 2023

Katherine Kelly Vidal
*Director of the United States Patent and Trademark Office*